(12) United States Patent
Bird et al.

(10) Patent No.: US 9,210,036 B2
(45) Date of Patent: Dec. 8, 2015

(54) METRIC DRIVEN HOLISTIC NETWORK MANAGEMENT SYSTEM

(75) Inventors: Robert Barrett Bird, Gainesville, FL (US); William Ward Saxon, Gainesville, FL (US)

(73) Assignee: University of Florida, Gainesville ( * ) Notice: Subject to any disclaimer, the term of this patent is extended or adjusted under 35 U.S.C. 154(b) by 2794 days.

(21) Appl. No.: 10/852,776

(22) Filed: May 25, 2004

(65) Prior Publication Data

US 2006/0031463 A1 Feb. 9, 2006

(51) Int. Cl.
*G06F 15/173* (2006.01)
*H04L 12/24* (2006.01)
*G06F 11/00* (2006.01)

(52) U.S. Cl.
CPC .......... *H04L 41/046* (2013.01); *H04L 41/0631* (2013.01); *H04L 41/0893* (2013.01)

(58) Field of Classification Search
USPC .......................................................... 709/223
See application file for complete search history.

(56) References Cited

U.S. PATENT DOCUMENTS

| | | | |
|---|---|---|---|
| 6,077,305 A | 6/2000 | Cheng et al. | |
| 6,219,786 B1 | 4/2001 | Cunningham et al. | |
| 6,654,782 B1 * | 11/2003 | O'Brien et al. | 709/201 |
| 7,363,656 B2 * | 4/2008 | Weber et al. | 726/23 |
| 7,469,418 B1 * | 12/2008 | Wilkinson et al. | 726/22 |
| 2002/0116512 A1 | 8/2002 | Amit et al. | |
| 2004/0098472 A1 * | 5/2004 | Styles et al. | 709/221 |
| 2005/0021740 A1 * | 1/2005 | Bar et al. | 709/224 |
| 2008/0147854 A1 * | 6/2008 | Van Datta et al. | 709/224 |
| 2009/0019538 A1 * | 1/2009 | Pandya | 726/13 |
| 2009/0168651 A1 * | 7/2009 | Xie | 370/235 |
| 2009/0187968 A1 * | 7/2009 | Roese et al. | 726/1 |

FOREIGN PATENT DOCUMENTS

EP 1026867 8/2000

* cited by examiner

*Primary Examiner* — Chris Parry
*Assistant Examiner* — Alan S Chou
(74) *Attorney, Agent, or Firm* — Randy R. Schoen; Christopher B. Linder

(57) ABSTRACT

A metric driven method for managing a network can include the step of specifying a profile for a network event. The profile can include multiple discrete factors and can be associated with at least one event operation. Metrics can be received from multiple remotely located components residing within a network space. The metrics can be compared to the discrete factors, where each compared metric can correspond to one of the factors. A determination based on this comparison can indicate whether the network event has occurred. When the network event has occurred, the previously specified event operation associated with the network event can be automatically executed.

22 Claims, 3 Drawing Sheets

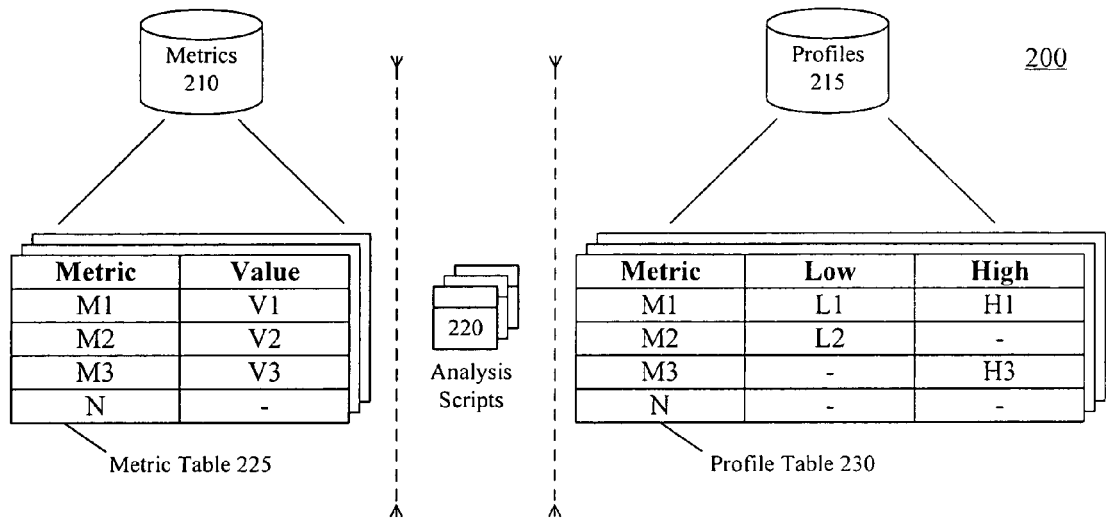

| Factor | Predominance | Information Source | Condition |
|---|---|---|---|
| Port1214 | High(8) | srvcRawSocket | UDP:dest_port==1214 |
| GetString | High(8) | appSnort | Contains: "get = /." |
| Point2MP | Absolute(10) | srvcRawSocket | Behavior: src_ip[Unique;-1,interval]->dst_ip [Unique;1-12,count;30,interval] |
| DNSqueries | Medium(5) | appDNSCache | Behavior: src_ip[Unique; 30;interval]->query_type [A,type;1,commonality] |

| Factor | Predominance | Information Source | Condition |
|---|---|---|---|
| BadHTTP | High(8) | appSnort | Contains:"get HTTP/1.1_0d 0a 0d 0a_" |
| BadHTTP | High(8) | appApacheLogHost144 | Contains:"client sent HTTP/1.1 request without hostname" |
| BadHTTP | High(8) | appApacheLogHost144 | Contains:"mod_ssl: SSL handshake inerrupted by system" |
| BadHTTP | Absolute(10) | BadHttp:1,2 | Time: 1,interval |
| Chkrootkit | Absolute(10) | appChkrootkit | Contains:"Warning: Possible Slapper Worm installed" |

FIG 2C

METRIC DRIVEN HOLISTIC NETWORK MANAGEMENT SYSTEM

BACKGROUND

1. Field of the Invention

The present invention relates to the field of computer software and, more particularly, to network management.

2. Description of the Related Art

Network management is typically handled in a modular fashion, where a software component or hardware device handles a designated operation. For example, network traffic is typically handled by a routers, bridges, and hubs; firewalling is usually handled by a software application; data access restrictions are often handled by a file managing component of an operating system; and e-mail filtering can be handled by an e-mail server routine. These modular network management tools usually utilize locally available information in their operation, where enforced policies are typically based upon one or more parameters relating to a request.

For example, file management systems usually require a data requesting source to identify itself by computer identifier and/or user identifier. The file management system then bases access rights upon the user identification and/or computer identifier. In another example, an e-mail filtering program can analyze e-mail parameters and only deliver e-mail that passes previously established criteria. That is, e-mail can be denied if it comes from a suspect sending source, if content contains key words or graphics that indicate that the e-mail is an unsolicited advertisement, and if the e-mail message fails to satisfy virus and malicious program detection algorithms.

Another conventional network management methodology relies upon establishing a fixed communication protocol relating to a particular function, where operational decisions can be dependent upon conditions established by the protocol. For example, the simple network management protocol (SNMP) establishes a standard for gathering statistical data about network traffic and the behavior of network components. SNMP defines communication devices as either agents or managers, where an agent provides networking information to a manager application running on a different computer. Similar message protocols and enterprise management protocols exist that define a standard and require external devices to adhere to that standard before operations are permitted.

Unfortunately, policies established by current network management solutions can be easily foiled. More specifically, traditional network management systems can be compromised by outside sources with knowledge of low-level specifics relating to a system. That is, most complex systems have a number of discernable weak points, sometimes called exploits, that can be used to circumvent network policies that network administrators attempt to implement. It is practically impossible to design network equipment that does not have some exploitable weaknesses. As soon as one weakness is patched, two new weaknesses are discovered and exploited. Further, each new hardwire device, operating system, network protocol, and technology introduces a myriad of new weaknesses.

Conventional network management solutions have failed to approach network management from a holistic perspective. A holistic approach would permit the decoupling of network policies from modularly defined protocols, devices, and software applications. Accordingly, data synergy achieved when combining network data from available network components has not been leveraged to enact network policies that cannot be easily circumvented.

SUMMARY OF THE INVENTION

The present invention provides a method, a system, and an apparatus for managing a network in accordance with the inventive arrangements disclosed herein. More specifically, metrics can be gathered from a multitude of components in a network space. These metrics, when combined, form a footprint from which network usages can be discerned. This footprint can be compared against previously established protocols. When the footprint and protocol are sufficiently correlated, one or more network actions can be automatically triggered. These network actions are not restricted to any one platform or protocol. Therefore, a multitude of network management protocols, security tools, anti-virus tools, operating system software, etc. can be integrated for the purpose of network policy enforcement.

For example, worms and viruses characteristically replicate themselves often and convey these replications across a network space, thereby self-propagating. A network footprint showing excessive replications over a short period exists for any worm or virus. Profiles can be developed that include factors characteristic of this footprint. When gathered metrics correlate with the profile for worm and/or virus activity, appropriate preventative actions can be automatically taken.

Appreciably, each type of network activity has a characteristic footprint for which profiles can be developed. Administrators can therefore implement any desired policy targeting any network activity. Accordingly, the network management solution disclosed herein is extremely flexible allowing the solution to be adapted to virtually any situation. For example, applications of the network management solution can include, but are not limited to, management of bandwidth and application control, such as peer-to-peer tile sharing automated network and host maintenance, Internet worm, virus, or other malware response and control, spam control, grid computing resource control, and the like.

One aspect of the present invention can include a metric driven method for managing a network. The method can include the step of specifying a profile for a network event. The profile can include multiple discrete factors and can be associated with at least one event operation. Metrics can be received from multiple remotely located components residing within a network space. The metrics can be compared to the discrete factors, where each compared metric can correspond to one of the factors. A determination based on this comparison can indicate whether a particular network event has occurred. When the network event has occurred, an event operation previously associated with the event can be automatically executed.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, and any other recording medium.

Another aspect of the present invention can include a network management system that includes multiple software kernels, which can be functionally distinct event-driven state machines. Types of software kernels can include, but are not limited to, a central manager kernel, an input manager kernel, a storage manager kernel, a data analysis manager kernel, and/or an output manager kernel. The software kernels can cooperatively collect network metrics from a plurality of network components, can perform multi-factor analysis based upon the metrics, and can execute software routines responsive to analysis results.

BRIEF DESCRIPTION OF THE DRAWINGS

There are shown in the drawings, embodiments that are presently preferred, it being understood, however, that the invention is not limited to the precise arrangements and instrumentalities shown.

FIG. 2A is a schematic diagram illustrating a system that compares network space metrics against factors of a profile in accordance with the inventive arrangements disclosed herein.

FIG. 2B illustrates a table for a peer-to-peer profile in accordance with the inventive arrangements disclosed herein.

FIG. 2C illustrates a table a worm detection profile in accordance with the inventive arrangements disclosed herein.

DETAILED DESCRIPTION OF THE INVENTION

Figure 1:
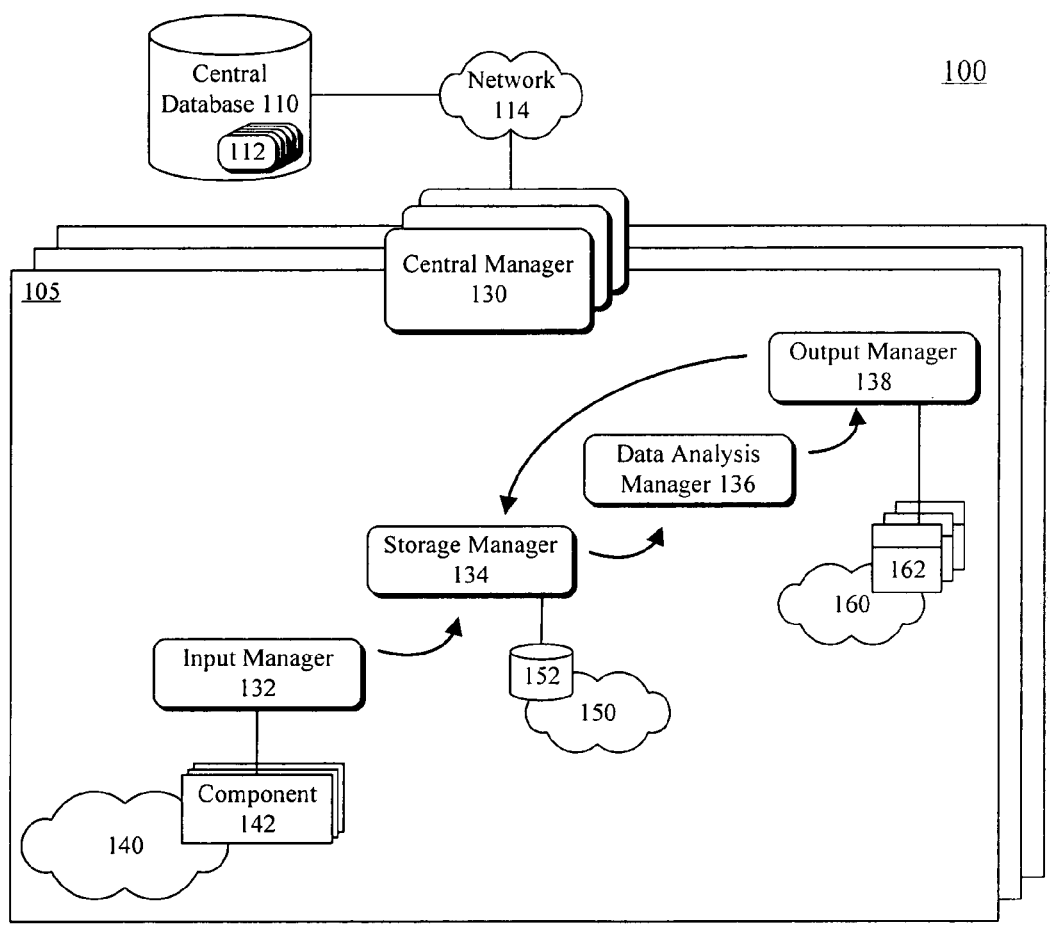
FIG. 1 is a schematic diagram illustrating a system that utilizes a holistic metric driven approach for managing networks in accordance with the inventive arrangements disclosed herein.

FIG. 1 is a schematic diagram illustrating a system 100 that utilizes a holistic metric driven approach for managing networks in accordance with the inventive arrangements disclosed herein. The system 100 can include a central database 110 located in a computing space external to at least one defined network space 105. The central database 110 can centrally contain data utilizable by several different network spaces 105 for policy establishment and enforcement purposes. Administrators can modify data in the central database 110, which can be responsively propagated to all suitable network elements regardless of the network space 110 with which the elements are associated, The central database 110 can be managed through a database management application, where the database management application is an application external to other components of system 100. The invention is not limited in this regard, however, and software managing the central database 110 can be embedded within other components of system 100.

In one embodiment, the central database 110 can define one or more profiles indicative of a targeted network activity. A profile can be based upon multi-factored metrics. For example, a profile can exist defining peer-to-peer networking activity, worm activity, network intrusion activities, network problem activities, and the like. Stored network profiles can be generic profiles, can be network space 105 specific, and can contain a combination of generic and network space 105 specific factors.

In another embodiment, the central database 110 can contain a multitude of model software kernels 112, where a software kernel can be an event-driven state machine responsible for a network management operation. One or more model kernel 112 can exist for each functional kernel type. Functional types of kernels can include, but are not limited to, an input manager 132, a storage manager 134, a data analysis manager 136, an output manager 138, and a central manager 130. Changes made to one of the model kernels 112 can result in corresponding changes being made to all software kernels of that functional type.

The input manager 132 can gather network metrics from at least one network component 142. Multiple input manager kernels 132 can exist within the network space 105, each associated with a sub-network 140 of the network space 105. The sub-network 140 can include one or more computing machines, one or more software applications, one or more hardware devices, or portions thereof. In one arrangement, the input manager 132 can be embedded within the component 142, which can be a hardware device or software routine from which the input managing kernel 132 receives metrics. In another arrangement, the input manager 132 can be externally located from the component 142.

Additionally, the input manager 132 can actively fetch metrics from one or more component 142. The input manager 132 can alternatively passively receive metrics conveyed to it from the components 142. The input manager 132 can also convert data metrics from a format specific to the component 142 into a component-independent format. Moreover, the input manager 132 can include a data cache, where metrics can temporarily be stored before being conveyed to the storage manager 134.

The storage manager 134 can store metrics and/or network management data within memory store 152. The memory store 152 can store data within a single hardware device as well as within a logical memory space spread across multiple devices within a storage network 150. Moreover, memory store 152 can include persistent memory areas as well as temporary memory areas.

In one embodiment, the storage manager 134 can store metrics from the input manager 132 in a global memory cache accessible by the data analysis manager 136. The storage manager 134 can store data within a file structure system as well as within a database structure. The storage manager 134 can define storage specific interfaces for each storage type it uses, thereby allowing the storage manager 134 to be implemented in a database independent and/or file system independent manner. Further, the storage manager 134 can automatically delete or archive metrics after a designed period.

The data analysis manager 136 can periodically analyze the data stored within the storage manager 134. The data analysis manager 136 can use a profile of multiple factors, each of which can be compared against corresponding metrics. Stronger correlations can result in stronger confidence levels that the network event or usage has occurred. The data analysis manager 136 can trigger one or more event operations depending upon the correlation between the footprint and the profile.

The data analysis manager 136 can utilize any of a variety of techniques to perform the correlation including algorithmic and heuristic techniques, pattern matching and topological techniques, supervised and unsupervised techniques fuzzy logic and probabilistic techniques, and the like. In one embodiment, the data analysis manager 136 can include a neural network and/or an expert system that analyze network metrics according to trained criteria. For example, a neural network refined by genetic algorithms can be used to locate patterns within collected data of an information space. The invention is not limited in this regard, however, and any correlation technique can be used by the data analysis manager 136.

The data analysis manager 136 can analyze metrics using small samples of the metrics and/or can utilize large metric samples as appropriate. Additionally, administrator selectable and/or multiple statistical analysis techniques can be utilized by the analysis manager 136. The data analysis manager 136 can also devote different levels of resources to different profiles.

In one embodiment, a profile representing a critical network policy can be analyzed more often and more exhaustively than a profile representing a minor network policy. In such an embodiment, an analysis of critical network policies can occur in near-real time and an analysis of minor network policies can occur on a daily, weekly, or monthly basis. In another embodiment, the data analysis manager 136 can receive metrics, such as metrics associated with single factor actions, directly from the input manager 132 for expedited processing.

Once the data analysis has determined an event operation is to be executed, messages triggering the event operation can be conveyed to the output manager 138. The output manager 138 can be configured to manage the execution of software routines. The output manager 138 can directly execute certain event-related operations. Other event-related operations, however, can be executed by applications 162 remote from the output manager 138. The executed applications 162 can include stand-alone applications or applications distributed across network 160. In one embodiment, the output manager 138 can convey results and or transaction records pertaining to event operations to the storage manager 134 for recordation purposes.

The central manager 130 can manage the kernels disposed within a network space 105 to which the central manager 130 is associated. The central manager 130 can function as a communication intermediary between the central database 110 and kernels within the network space 105, conveying data as needed.

By way of illustration, the central manager 130 can be deployed within the network space 105 and conveyed policy enforcement parameters. The central manager 130 can then access the central database 110 (via network 114) to determine profiles and other data necessary to implement the desired network policies. The central manager 130 can start kernels within the network space 105, which can include one or more instances of the input manager 132, the storage manager 134, the data analysis manager 136, and the output manager 138. Each of the kernels can include one or more options and settings that the central manager 130 can adjust to achieve desired behavior.

The central manager 130 can centrally maintain state information of the network space 105. Further, the central manager 130 can convey assignments to the various kernels within the network space 105, these assignments can vary depending upon the state of the network space 105. Further, the central manager 130 can periodically access the central database 110, checking for updates. If updates exist, the central manager 130 can retrieve the updates and convey them to appropriate ones of the kernels in the network space 105.

It should be appreciated that the arrangements shown in FIG. 1 are for illustrative purposes only and that the invention is not limited in this regard. The functionality attributable to the various kernels can be combined or separated in different manners than those illustrated herein. For instance, the data analysis manager 136 and the output manager 138 can be implemented as a single software component in another arrangement of the present invention.

In still another arrangement, the central manager 130 can be implemented as more than one kernel. For example, one kernel can manage the state of the network space 105, a separate kernel can handle the configuration of the kernels, and/or a different kernel can manage communications with the central database 110.

It should also be appreciated that processing within system 100 is not necessarily handled in a linear fashion as depicted in FIG. 1. Instead, the kernels of system 100 can establish a flexible and dynamic system where a multitude of interactions occurs between the various kernels. In one arrangement, all other types of kernels can have associated storage manager 134 modules. For example, an input manager 132 module wrapping an application like appSnort can have associated storage manager 134 modules (like storage_cache, storage_cache, storage_db, etc.), the details of which can be determined by analysis requirements and policy. Consequently, in system 100, persistence can be handled in a flexible and independent fashion.

FIG. 2A is a schematic diagram illustrating a system 200 that compares network space metrics against factors of a profile in accordance with the inventive arrangements disclosed herein. The system 200 can include a metric data store 210, such as a store managed by the storage manager 134 of FIG. 1. The metrics can be represented as one or more metric tables 225. Each metric table 225 can specify one or more metrics, which together form a footprint of a network usage or event. For each metric in the metric table 225, a metric identifier and value can be specified. Appreciably, metrics in the metric table 225 can be gathered from a multitude of different network components.

The system 200 can also include a profile data store 215 that contains profiles that the data analysis manager 136 of FIG. 1 can utilize to determine the occurrence of a network event. Each profile in the profile data store 215 can be represented by a profile table 230. The profile table 230 can include a multitude of metrics, each metric corresponding to a metric of the metric table 225. For example, M1 in the metric table 230 can correspond to M1 in the metric table 225 (M2 to M2, M3 to M3, etc). The profile table 230 can define a normal operating range in which metric values should be within under the profile. For example, a low and a high value can be indicated within the profile table 230.

One or more analysis scripts 220 can be executed to correlate the metric table 225 with a related profile table 230. The analysis scripts 220 can be written in any programming or scripting language, such as Practical Extraction and Reporting Language (PERL), C, JAVA and the like. The analysis scripts 220 can generate a correlation value between the metric table 225 and the profile table 230. The correlation value can be a summation of discrete metric comparisons. In constructing the correlation value, different metrics can be assigned different weights. The correlation value can be compared against a correlation threshold and/or a plurality of correlation levels. Different event operations can be associated with each of these correlation levels.

FIG. 2B illustrates a table 250 for a peer-to-peer profile in accordance with the inventive arrangements disclosed herein. The table 250 includes columns for factor, predominance, information source, and condition. Factor is a designator for a metric and/or network characteristic. For example, factors for detecting peer-to-peer activity can include., but are not limited to, factors for port1214, GetString, Point2MP, and/or DNSqueries.

The predominance column of table 250 can represent how indicative the presence of the associated factor is to an event that is to be detected. In one embodiment, the predominance can be a number on a scale, such as 1-10, where 1 can indicates an slight possibility of an occurrence of a profiled event and 10 can be an absolute indication of an occurrence. For example, the Point2MP can be a factor that when detected absolutely indicates an occurrence of a peer-to-peer event. In another example, the DNSqueries factor can be a factor that indicates with a medium certainty that a peer-to-peer even is occurring. Port1214 and GetString can indicate an event with a high certainty.

In one embodiment, predominance factors can include both positive and negative numbers. For example, when particular factors are not present, the lack of presence can be indicative of a non-occurrence of a profiled event. A high degree of accuracy can be achieved when detecting events through multiple, weighted factors. Further, using multiple factors with different predominance characteristics within a profile can make circumventing event detections extremely difficult. For example, even though sophisticated users may be able to hide a domain address and/or initiating address when Web surfing, users cannot hide all metrics characteristic an activity in which the user is engaged. That is, peer-to-peer file sharing involves contacting many different Web sites in a short time period, downloading large quantities of files often having characteristic file extensions, and the like.

The information source column of table 250 can indicate a network component and/or element associated with a factor. The information source can include any element from which metrics can be gathered. In table 250, illustrative information sources include a srvcRawSocket, appSnort, and appDNSCache.

The condition column of table 250 can indicate a test condition for the factor. A test condition can search a data location and/or file for a particular string, can monitor behavior of a network component, can determine a port being accessed, and the like.

FIG. 2C illustrates a table 260 for a worm detection profile in accordance with the inventive arrangements disclosed herein. The columns of table 260 can include a factor, a predominance, an information source, and a condition, each of which have been previously defined for table 250.

According to table 260, when the appSnort element includes the string "get HTTP/1.1-0d 0a 0d 0a_", then there is a high likelihood that the slapper worm is installed due to a badHTTP factor. A high likelihood of the slapper worm being present is also indicated whenever the appApacheLogHost144 element contains a string of "client sent HTTP/1.1 request without hostname" or contains a string of "mod_ssl: SSL handshake interrupted by system". Further, an absolute indication of the worm exists when the BadHTP: 1,2 element has a designated time interval characteristic of the worm. Additionally, an absolute indication of the worm exists when the appChkrootkit element contains a string of "Warning Possible Slapper Worm installed."

It should be appreciated that table 250 and table 260 are for illustrative purposes only and that the invention is not to be limited in this regard. That is, profiles can be established for any network event and/or occurrence. Further, any network operation can be executed responsive to the occurrence of the detected event.

Figure 3:
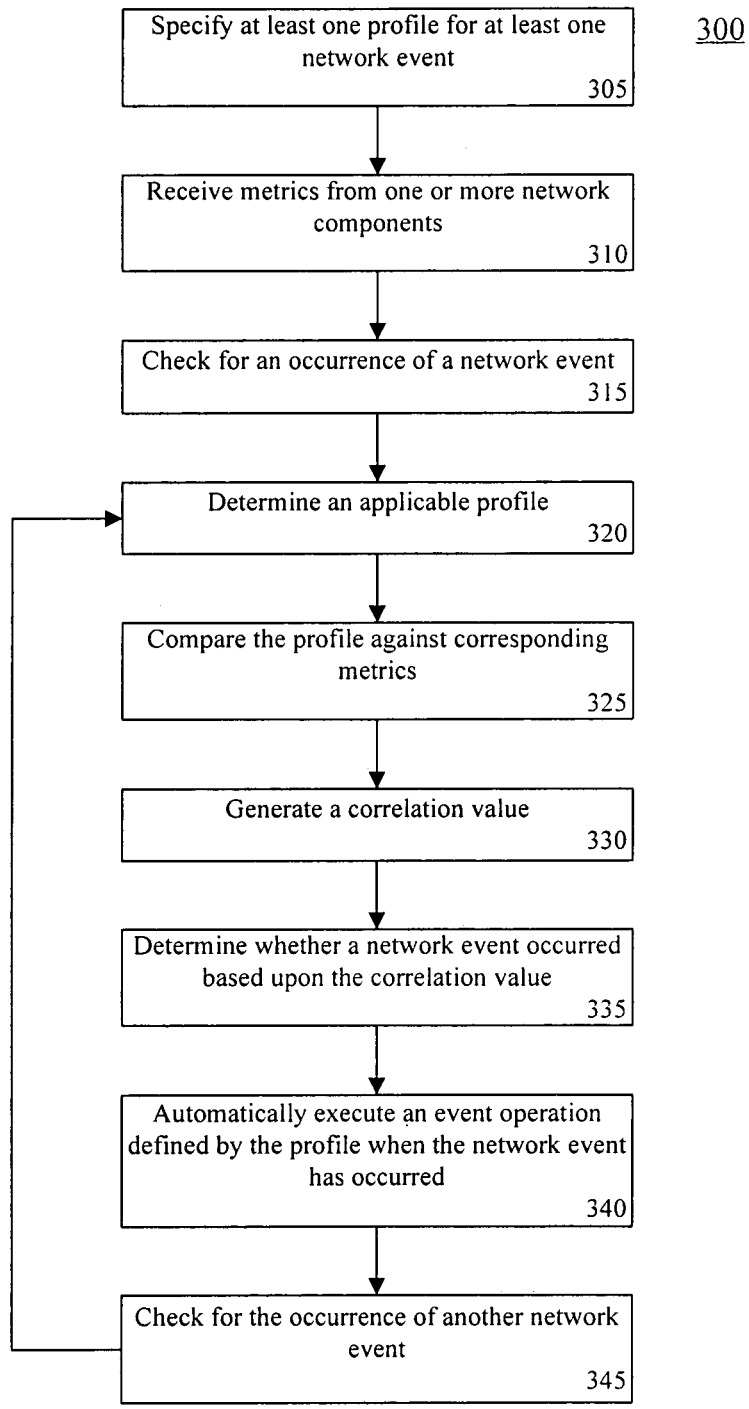
FIG. 3 is a flowchart illustrating a method for managing a network in accordance with the inventive arrangements disclosed herein

FIG. 3 is a flowchart illustrating a method 300 for managing a network in accordance with the inventive arrangements disclosed herein. The method 300 can be performed in the context of a holistic network management system, such as the system 100 of FIG. 1. The method can begin in step 305, where one or more profiles can be specified. When network metrics correspond to factors established within a profile, a network event is believed to have occurred. Any number of factors representing metrics gathered from multiple network components can be established as profile factors. Additionally, one or more event operations can be specified within the profile. In step 310, metrics can be received from one or more network components 310. These metrics can be stored within a storage space.

In step 315, the method can check for the occurrence of a particular network event. For instance, in step 320, a profile associated with the network event can be determined. In step 325, the factors defined within the profile can be compared against corresponding metrics gathered from network components. In step 330, a correlation value can be generated. In step 335, the correlation value can be used to determine whether a network event has occurred. In step 340, an event operation defined by the profile can be automatically executed when the operation event has occurred.

For example, the operation event can notify an administrator or related user of a network event. The operation event can also be an event designed to immediately correct a network occurrence that is not permitted by an established network policy. The network event can also initiate an additional network detection algorithm to confirm that an indicated event really has occurred before taking responsive actions. Different confidence levels that an event has occurred can be linked to different responsive actions.

In step 345, the method can check for another network condition by looping back to step 320. Any number of network conditions or occurrences can be examined in this manner. Further, the method can be periodically applied to continuously monitor a network space.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A metric driven method for managing a network comprising the steps of:
deploying a plurality of software kernels into a network space as deployed software kernels, each of the deployed software kernels having a designated network management role;
specifying at least one master kernel in a computing space external to the network space;
modifying the at least one master kernel; and
automatically updating at least one of the deployed software kernels in the network space to conform to the modified at least one master kernel, wherein the updating comprises dynamic provisioning and synchronizing of the network space; and
for a specified network event, defining a profile associated with the specified network event, the profile consisting of a plurality of discrete conditions and one or more actions associated with the plurality of discrete conditions, each discrete condition of the plurality of discrete conditions based on a corresponding metric, the one or more actions to be taken based upon the plurality of discrete conditions;

wherein, in addition to the designated network management roles, the combination of deployed software kernels, when executed, result in the following steps being performed:

receiving a plurality of metrics from a plurality of remotely located components within a network space;

performing incremental correlation of the plurality of metrics with corresponding discrete conditions of the profile;

determining whether the specified network event has occurred based upon the incremental correlation step; and when the specified network event has occurred, automatically executing at least one of said one or more actions;

wherein the receiving, the correlating, the determining, and the executing steps can be performed by different combinations of deployed software kernels selected from the plurality of software kernels.

2. The method of claim 1, wherein at least one of the deployed software kernels is a data gathering kernel and at least one of the deployed software kernels is a data receiving kernel wherein the data gathering kernel gathers at least a portion of the plurality of metrics to be conveyed to the data receiving software kernel.

3. The method of claim 1, wherein at least one of the deployed software kernels is a metric analyzing kernel and at least one of the deployed software kernels is a job executing kernel, wherein the metric analyzing kernel performs said receiving step, said correlating step, said determining step, and issues a job request for an event operation to the job executing kernel.

4. The method of claim 1, said specifying step further comprising specifying the profile in a data store residing in the computing space external to the network space, wherein said method further comprises a step of conveying parameters of the profile from the computing space to at least one of the deployed software kernels within the network space, whereby profile data is centrally managed within the data store that is accessible by deployed software kernels residing within remote network spaces.

5. The method of claim 1, further comprising the steps of:

specifying a plurality of correlation levels for the profile, each of the plurality of correlation levelss being associated with a particular one of the one or more actions; and determining a particular one of the plurality of correlation levels based upon the incremental correlation of the plurality of metrics with corresponding discrete conditions of the profile during the correlating step, where the executing step executes the particular one of the one or more actions associated with the determined correlation level.

6. The method of claim 1, further comprising:

automatically confirming the specified network event has occurred using at least one software application that does not rely upon the plurality of discrete conditions defined by the profile; and when the specified network event is confirmed, performing said executing step.

7. The method of claim 1, wherein the plurality of metrics are gathered in near real-time and stored within a data store, wherein the receiving step utilizes the data store, and wherein the correlating step is intermittently performed in a non-real-time manner.

8. The method of claim 1, wherein the specified network event is a peer-to-peer file-sharing event.

9. The method of claim 8, wherein the one or more actions include providing a notice to a user associated with the peer-to-peer file-sharing event.

10. The method of claim 8, wherein the one or more actions include suspending network access privileges to a user associated with the peer-to-peer file-sharing event.

11. The method of claim 1, wherein said specified network event is a malicious program detection event.

12. The method of claim 11, wherein the one or more actions include disabling a detected malicious program.

13. The method of claim 1, wherein the specified network event is a spam detection event.

14. The method of claim 1, wherein the specified network event indicates an occurrence of a network error, and wherein the one or more actions comprise a maintenance action that automatically corrects the network error or that notifies a network administrator of the network error.

15. A non-transitory machine-readable recording medium having stored thereon, a computer program having a plurality of code sections, said code sections executable by a machine for causing the machine to perform the steps of deploying a plurality of software kernels into a network space as deployed software kernels, each of the deployed software kernels having a designated network management role;

specifying at least one master kernel in a computing space external to the network space;

modifying the at least one master kernel; and automatically updating at least one of the deployed software kernels in the network space to conform to the modified at least one master kernel, wherein the updating comprises dynamic provisioning and synchronizing of the network space; and for a specified network event, defining a profile associated with the specified network event, the profile consisting of a plurality of discrete conditions and one or more actions associated with the plurality of discrete conditions, each discrete condition of the plurality of discrete conditions based on a corresponding metric, the one or more actions to be taken based upon the plurality of discrete conditions;

wherein, in addition to the designated network management roles, the combination of deployed software kernels, when executed, result in the following steps being performed:

receiving a plurality of metrics from a plurality of remotely located components within a network space;

performing incremental correlation of the plurality of metrics with corresponding discrete conditions of the profile;

determining whether the specified network event has occurred based upon the incremental correlation step; and when the specified network event has occurred, automatically executing at least one of said one or more actions;

wherein the receiving, the correlating, the determining, and the executing steps can be performed by different combinations of deployed software kernels selected from the plurality of software kernels.

16. The non-transitory machine-readable recording medium of claim 15, wherein the specified network event is a peer-to-peer file-sharing event.

17. A network management system comprising:

memory storing a plurality of software kernels;

a plurality of processors that each have one or more of the plurality of software kernels functioning as separate event-driven state machines that cooperatively collect a plurality of network metrics from a plurality of network components, perform multi-factor analysis based upon the plurality of network metrics, and execute software routines responsive to analysis results, wherein the multi-factor analysis comprises incremental correlation of the plurality of network metrics with corresponding discrete conditions of a defined profile, and wherein the defined profile consists of a plurality of discrete conditions and one or more actions associated with the plurality of discrete conditions, each of the plurality of discrete conditions based on a corresponding metric, the one or more actions to be taken based upon the plurality of discrete conditions, wherein the software routines are configured to implement the one or more actions responsive to the analysis results, wherein different sets of the plurality of software kernels are associated with different network spaces, each set of software kernels managing the network space associated with that set of software kernels; and a central database configured to define factors upon which the multi-factor analysis is based, wherein data within the central database defines the factors for a plurality of the different network spaces, and wherein the central database is also configured to contain model software kernels, wherein changes made to the model software kernels result in corresponding changes being made to software kernels deployed in the different network spaces.

18. The system of claim 17, said plurality of software kernels comprising: at least one central manager kernel, each central manager kernel managing a set of kernels associated with a designated network space.

19. The system of claim 17, said plurality of software kernels comprising: at least one input manager kernel, each input manager kernel gathering network metrics from at least one network component and conveying the network metrics to other software kernels.

20. The system of claim 17, said plurality of software kernels comprising: at least one storage manager kernel, each storage manager kernel storing network metrics gathered by a different type of software kernel so that yet another type of kernel is able to process the network metrics in batch.

21. The system of claim 17, said plurality of software kernels comprising: at least one data analysis manager kernel, each data analysis manager kernel configured to determine whether a network event has occurred based upon the network metrics.

22. The system of claim 17, said plurality of software kernels comprising: at least one output manager kernel, each output manager kernel configured to manage execution of the software routines.

* * * * *